Oct. 16, 1951  H. F. BENNETT  2,571,657
CATADIOPTRIC LENS SYSTEM
Filed April 27, 1945  3 Sheets-Sheet 1

HAROLD F. BENNETT
INVENTOR
BY
ATTY & AG'T

Oct. 16, 1951     H. F. BENNETT     2,571,657
CATADIOPTRIC LENS SYSTEM

Filed April 27, 1945     3 Sheets-Sheet 2

HAROLD F. BENNETT
INVENTOR
BY
ATT'Y & AG'T

Oct. 16, 1951    H. F. BENNETT    2,571,657
CATADIOPTRIC LENS SYSTEM
Filed April 27, 1945    3 Sheets-Sheet 3

HAROLD F. BENNETT
INVENTOR
BY
ATT'Y & AG'T

Patented Oct. 16, 1951

2,571,657

UNITED STATES PATENT OFFICE 2,571,657

CATADIOPTRIC LENS SYSTEM

Harold F. Bennett, Rochester, N. Y., assignor to Eastman Kodak Company, Rochester, N. Y., a corporation of New Jersey Application April 27, 1945, Serial No. 590,598

1 Claim. (Cl. 88—57)

The present invention relates to catadioptric lens systems for photography, projection, television, signalling, microscopy, and similar purposes.

An object of the invention is to provide catadioptric systems having large relative apertures and wide angular fields.

A further object of the invention is to provide catadioptric systems in which the spherical aberration is considerably reduced or substantially corrected without the use of aspherical surfaces, so that if aspherical surfaces are used at all, the degree of figuring is very slight.

The reflecting system invented by B. Schmidt and described in the Zentralzeitung für Optik und Mechanik, vol. 52, pp. 25-26, 1931, has become well known and widely used. Schmidt was the first to place the diaphragm at the center of curvature of a spherical reflector and, unless the required aperture happened to be less than about f/10, he placed a thin nearly flat figured correcting plate at the diaphrgam. This system gives remarkably good results with relative apertures up to f/1 or even larger and on a curved field up to about ±15°. On the other hand, a flat field can be obtained at the expense of a somewhat smaller aperture and field by adding a positive lens close to the focal plane as a field flattener.

In spite of its remarkable performance, the Schmidt system has not been used as widely as might be desired on account of the difficulty of making the aspherical correcting plate to the requisite degree of accuracy.

To overcome this difficulty, several attempts have been made to design correcting systems consisting entirely of optical elements having spherical surfaces only. (A plane surface is considered to be a spherical surface having zero curvature.) These attempts have met with a fair degree of success as regards the system being easier to make but none of them known prior to the present invention makes any improvement on the performance of the Schmidt system.

According to the present invention the spherical aberration of a spherical mirror is considerably reduced or entirely corrected by one or more lens elements whose refracting surfaces are spherical and are concentric or nearly concentric with the mirror. Preferably the diaphragm is also substantially concentric therewith. A larger angular field is thereby covered than that attained in any corrected reflecting system hitherto known. In fact in certain embodiments of the invention, a long narrow field is covered which may reach or exceed ±75° in the long direction.

The idea of a spherical mirror combined with a concentric spherical correcting element first occurred to me in connection with some work on a Mangin type mirror. As is well known (Dictionary of Applied Physics, vol. IV, p. 524, London, 1923) the Mangin mirror consists of a negative meniscus lens, the convex surface of which is silvered. I considered the possibilities of a Mangin mirror used with a diaphragm at a distance in front of the mirror, thereby forming a Schmidt system without the aspheric correcting plate. Computations showed that the coma is not as well corrected as might be desired, and the lateral color is objectionable due to the prism-like effect that the thicker edge has upon the oblique pencils of rays. Moreover the Petzval sum is even worse than that of a simple spherical mirror.

Suddenly it flashed into my mind that the front surface could be made concentric with the rear surface and that an oblique pencil of rays would then be centered around an oblique axis passing through the centers of curvature of both surfaces and would thus be corrected in exactly the same manner and degree as an axial pencil of rays except for the slight effect of a somewhat different cross-section of the pencil. In other words coma, astigmatism, lateral color, and angular distortion of all orders would be eliminated at all obliquities.

It will be seen that even if the spherical aberration were only partly corrected, two advantages would be gained. First the amount of figuring on the aspheric correcting plate would be reduced, and second the correction of the oblique aberrations would be correspondingly improved.

This is because the weakening of the aspheric correcting plate would reduce the higher order coma and astigmatism arising therein.

Certain forms of this embodiment were found to be less satisfactory than others. A concentric back-silvered mirror with thickness $0.05 f$, where $f$ is the focal length of the mirror, has about 99 per cent as much aberration as a simple mirror, hardly enough improvement to be worth bothering about. However, it was found that increasing the thickness improves the degree of correction of the aberration in more than linear proportions, and that the aberration can be completely corrected for any one specified zone of the aperture by making the thickness so great that nearly the whole space from the reflecting surface to the focal surface is filled with glass.

This arrangement has certain drawbacks for many practical uses. In the first place the thickness of the glass is prohibitive in long focal length systems. In the second place, the front surface of the correcting element is tantalizingly near to the focal surface, but still a separate support for the latter must be provided.

In attempting to avoid these drawbacks, further experiments were made. Up to this point a refractive index of 1.5 had been assumed. The index was now varied, and it was found that a lower index permitted both a thinner mirror and a front surface closer to the focal plane. Thus it is readily seen that a low index is distinctly an advantage in this particular system. This is very fortunate since low index materials generally are lighter in weight and have less chromatic dispersion (higher dispersive index). As a matter of fact an index of 2.0 would involve an infinite thickness.

Very low indices were then tried, and it was found that an index of about 1.22 (depending somewhat upon the zone to be corrected) would satisfy both conditions (i. e. spherical correction and image lying on the front surface) simultaneously. This system could be made up for example by submerging a lens of index slightly greater than 1.62 in water or methanol, whose indices are about 1.33.

From this computing I perceived two facts regarding all strictly concentric systems which should have been evident from broad theoretical considerations. First, the Petzval sum is always $$\pm \frac{1}{N'}$$

times the reciprocal of the focal length, where $N'$ is the refractive index of the image space relative to the object space. (The object is assumed to be infinitely distant.) This fact is very useful in computing, because the computer can thereby solve for any radius of curvature in the system to get a system with a predetermined focal length and not be limited to solving for the last surface traversed as is the case in most optical systems. The second fact is that, where N is the refractive index of any medium in the system, R is the radius of curvature of one of the surfaces bounding that medium, and I is the angle of incidence or of refraction of a ray in that medium, then $$NR \sin I$$

is an invariant for that ray throughout the system. (In this connection a suitable sign convention should be used, e. g. one in which a medium has a negative refractive index when traversed by a ray that has suffered an odd number of reflections.) This fact is also very useful in computing since it enables one to compute the angles of incidence and refraction at the different surfaces in any order, not being limited (as is usual) to computing them in the order in which they are traversed by the light ray. Accordingly, if some of the surfaces or indices are changed, all the ray data relating to the other surfaces stand without change, and only the modified surfaces need be computed anew.

Applying these rules, several refinements of the basic invention were developed and are illustrated in the accompanying drawings in which:

Figs. 1 and 2 show back-silvered concentric mirrors according to the invention.

Figs. 3, 4, and 6 are graphs showing the effects of thickness and of refractive index.

Figs. 5, 7, and 8 show preferred forms of catadioptric systems.

Figure 1:
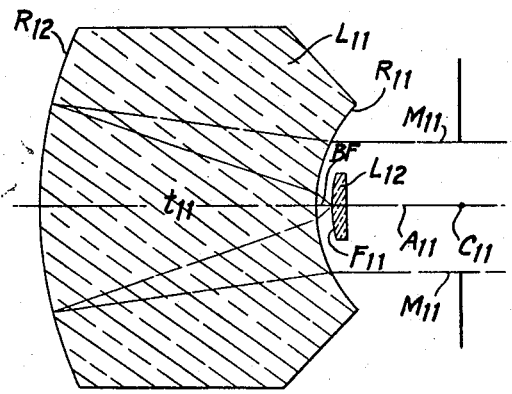

Figure 1 shows the original form of the invention adapted to be made up of commercially available borosilicate crown ($N=1.498$) glass. Surfaces $R_{11}$ and $R_{12}$ of the lens $L_{11}$ have a common center $C_{11}$ at the center of the diaphragm opening. Marginal rays of light $M_{11}$ entering parallel to the axis $A_{11}$ are rendered divergent by the front surface $R_{11}$ then convergent by reflection at the second surface $R_{12}$ after which they emerge through the front surface, becoming still more convergent, and come to a focus with the other parallel rays at the axial point of the focal surface $F_{11}$ on the convex side of the support $L_{12}$.

Figure 2:
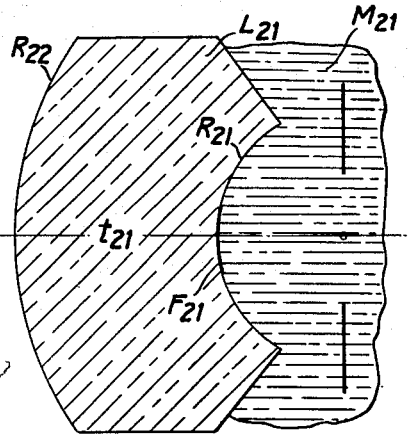

Figure 2 shows a similar system in which the lens $L_{21}$ has a refractive index of 1.218 relative to the ambient medium $M_{21}$ and the focal surface $F_{21}$ coincides with the front surface $R_{21}$ of the lens. The ambient medium may be water ($N=1.333$) or methanol ($N=1.331$) and the lens may be dense barium crown ($N=1.624$ or $1.622$). Other media as a rule have higher refractive indices than water, and if used in its place would require a glass with proportionately higher index.

Figure 3:
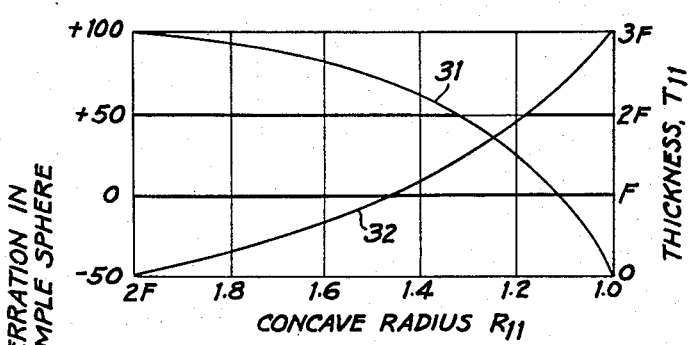

Fig. 3 relates to Fig. 1 and is a graph showing two curves. One curve 31 shows the spherical aberration of the f/1.0 ray expressed in percent of that of a simple spherical mirror according to the ordinate scale on the left and as a function of the radius of curvature $R_{11}$ of the front surface of the lens $L_{11}$ as given by the abscissa scale. The other curve 32 shows the thickness $t_{11}$ according to the ordinate scale on the right and likewise as a function of the front radius $R_{11}$. The refractive index is 1.50 and the radius of curvature of the convex surface $R_{12}$ is found by adding $R_{11}$ and $t_{11}$. As already stated, a concentric back-silvered mirror may be combined with an aspherical correcting plate which is weaker than that used with a concave front-silvered mirror. Fig. 3 aids a designer in choosing a suitable thickness and relative degree of figuring of the correcting plate. It also illustrates the early development of the invention as previously described.

Figure 4:
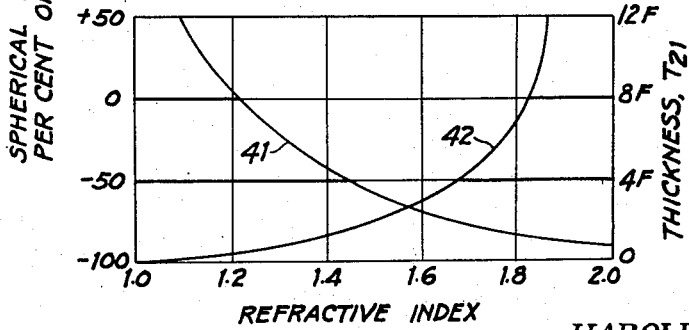

Fig. 4 similarly relates to Fig. 2 in which the lens $L_{21}$ completely fills the space between the reflecting surface R22 and the focal curve F21. The abscissa scale gives the refractive index of the lens L21 relative to that of the ambient medium. One curve 41 shows the spherical aberration of the f/1.0 ray as a percentage of that of a simple mirror according to the ordinate scale on the left, and the other curve 42 shows the thickness t21 according to the ordinate scale on the right. The advantage of a low index in this system is easily seen.

Since the two simple systems shown in Figs. 1 and 2 were not completely satisfactory, computations were undertaken to see whether the best features of both could be combined in one system, i. e. a convenient refractive index and an image falling on the front surface. I experimented with two concentric meniscus elements filling the space from the mirror to the focal plane. Again I found a low index to be advantageous, particularly in the back-silvered element. Suddenly it occurred to me that this index could be made as low as 1.00, which of course means an airspace backed by a front silvered mirror. A little more computing was done to determine the best radii to correct a marginal ray at about f/1.2 and the excellent system shown in Figure 5 resulted.

Figure 5:
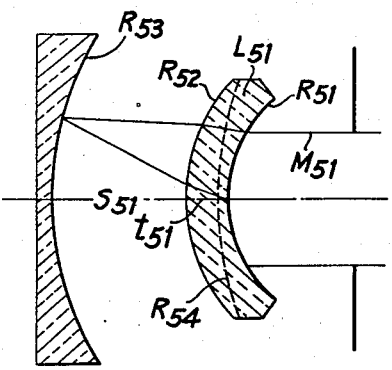

In Figure 5 (Example 3) the aberration of the spherical mirror R53 is corrected by the concentric meniscus element L51 which is traversed twice by the rays of light such as the marginal ray M51 shown.

Taking this new concept of a meniscus correcting element, I reviewed the systems shown in Fig. 1 and Fig. 5. It appeared that as the front surface of the meniscus lens element is given a shorter radius of curvature the lens becomes thinner. Extrapolating, I concluded that a still thinner and correspondingly more convenient correcting element could be made: for example one whose convex surface coincides with the image. This was successfully tried, and the system shown in Fig. 7 resulted. In this system the correcting element is traversed only once by the rays of light, and so a somewhat greater thickness is required than predicted by the extrapolation.

Figure 6:
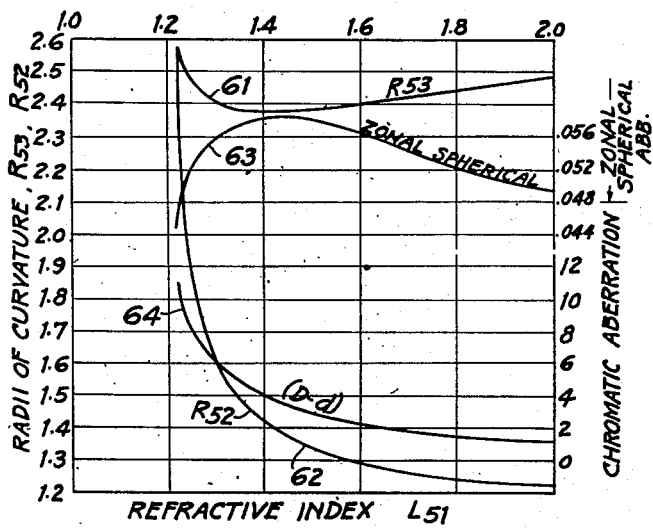

A more extended study afterward resulted in Fig. 6 which relates to Fig. 5 and is a graph showing the effects of a change of index of the meniscus correcting element L51. All the data in this graph pertains to systems in which the spherical aberration of the F/1.0 marginal ray is corrected. The abscissa scale shows the refractive index of the lens L51 varying from 1.00 to 2.00. The two curves 61, 62 show the corresponding radii of curvature of the mirror and lens surfaces R53 and R52 of a corrected system according to the ordinate scale on the left. The front surface R51 has a radius of curvature equal to the focal length in all cases. In this case it is readily seen that using a high refractive index results in a much thinner and hence more convenient lens element, while on the other hand an index of about 1.4 gives the shortest system. Data are not given for indices less than 1.218 because the systems cannot be constructed practically.

The other two curves 63, 64 show the corresponding spherical aberration of the F/1.41 zone and the difference of path length as between the marginal and the paraxial ray within the lens L51, each according to its respective ordinate scale on the right. The difference in path length (called $D-d$) is used in computing the chromatic aberration. See Jacobs "Fundamentals of Optical Engineering," p. 409, New York, 1943. The chromatic aberration is found by multiplying $(D-d)$ into the mean dispersion $(N_F-N_C)$. Seemingly, a high index should be better because of the smaller path difference $(D-d)$. Of known suitable materials, however, fluoride materials such as lithium fluoride (1.392/99.5) or calcium fluoride (1.434/95.1) are actually the best. Here the refractive index and the dispersive index are given in parentheses. To equal these would require a hypothetical substance with indices such as (1.50/92) or (1.80/83) for example.

Figure 7:
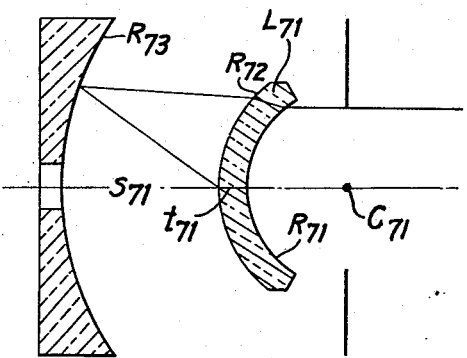
Figure 8:
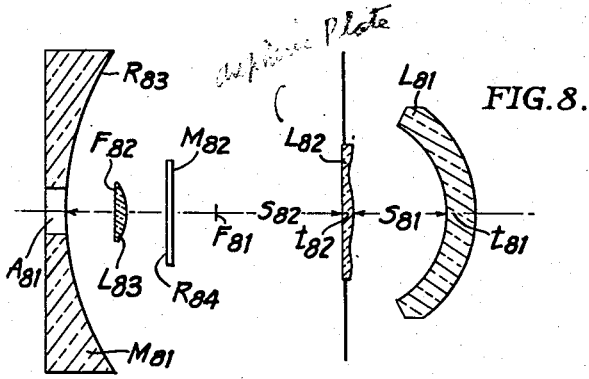

Fig. 8 illustrates four variations which can be used together as shown or independently in certain of the systems illustrated. First, the lens element L81 has the same thickness and shape as that shown in Fig. 7 but it is on the opposite side of the center of curvature C71. It has precisely the same effect upon the aberrations in either position. Second, a figured plate L82 is shown by which the zonal spherical aberration can be corrected. The degree of figuring is enormously exaggerated, and actually amounts to only a few millionths of the focal lengths. Third, a mirror M82 with a reflecting surface R84 is interposed between the mirror M81 and the focus F81 and causes the image to be thrown back in the other direction where it can be viewed through the aperture A81 in the mirror M81. Fourth, a convex field flattener L83 is inserted just before the focal plane F82 in known manner. It has already been explained that the task of correcting the spherical aberration can be divided between the meniscus correcting lens and the figured plate in any suitable proportion. Preferably the lens corrects the aberration by more than half. The space S82 extends from the plate L82 to the mirror M81.

Some investigation was made regarding the color aberrations. One of the outstanding advantages of the strictly concentric system is that lateral color is completely eliminated. There is a slight amount of axial color aberration, however, which would be scarcely noticeable in lens systems of ordinary large apertures such as f/2.0 but in lenses of such extremely large apertures as are possible according to the present invention it begins to be noticeable. The concave mirror of itself is of course free from chromatic aberration. The meniscus correcting element has a slightly negative power and introduces a slight amount of negative or overcorrected chromatic aberration in proportion to the dispersion of the glass. This aberration is reduced when desired by using optical materials of lower dispersion such as crystalline lithium fluoride or calcium fluoride or low dispersion glasses such as those disclosed in copending application Serial No. 568,314, filed December 15, 1944, now Patent 2,511,224, dated June 13, 1950, and Serial No. 585,187, filed March 27, 1945, now Patent 2,415,661, dated February 11, 1947, both by Sun and Huggins.

Another alternative is to make up the correcting lens of a positive flint glass element and a negative crown glass element cemented as indicated by the dotted line R54 in Fig. 5. This cemented surface introduces lateral color even through the mean index is the same on the two sides. Furthermore it increases the chromatic aberration of the reflected pencil of rays while decreasing that of the entering pencil of rays with a net result of only a small improvement. There are other embodiments of the invention in which the reflected beam does not go through the correcting element, and the color can be more effectively improved in those cases by this method.

A third method of correcting color is obvious from the path difference method already mentioned. An inspection of any of the optical systems shown in Figs. 1 to 11 shows that the path length in glass is greater for the marginal ray than for any parallel zonal ray or paraxial ray. These path lengths should be made more nearly equal to improve the color. This is obviously to be done by departing from concentricity in the direction of making the edge thickness less than the center thickness. Computations showed that the average thickness must be increased to maintain the same degree of correction of the spherical aberration, and this increased average thickness increases the chromatic aberration effect on the returning beam thus partly cancelling the improvement effected on the incident beam if the returning beam passes through the correcting element as in Figs. 1, 2, 5, 9, 10, or 11. Some improvement is gained, however, even in these cases, and since the chromatic aberration is very slight anyway, it is corrected to a very high degree by this method when such high correction is desired.

Obviously these last two methods of correcting aberration involve some departure from strict concentricity. This departure unavoidably results in introducing a slight degree of lateral aberrations, i. e. coma, angular distortion, lateral color, and astigmatism. Third order coma however can usually be eliminated by choosing a suitable shape for the correcting element. The final decision involves a question of tolerances, and in each individual case the lens designer must decide whether a slight amount of chromatic out-of-focus effect uniform over the whole field is worse or better than a slight amount of lateral color, astigmatism, and higher order coma, or whether a comprise in which each is partly corrected is preferable.

Figure 10:
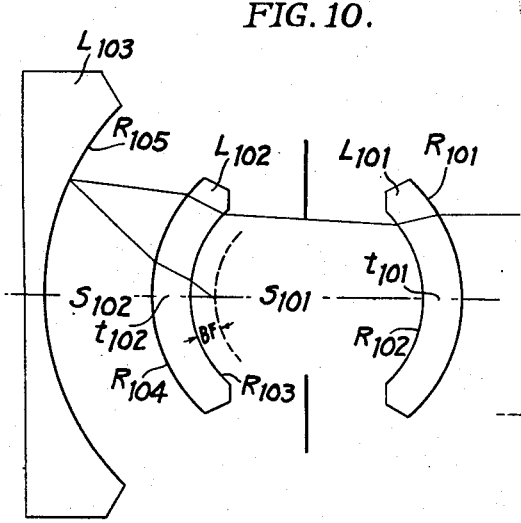
Figure 12:
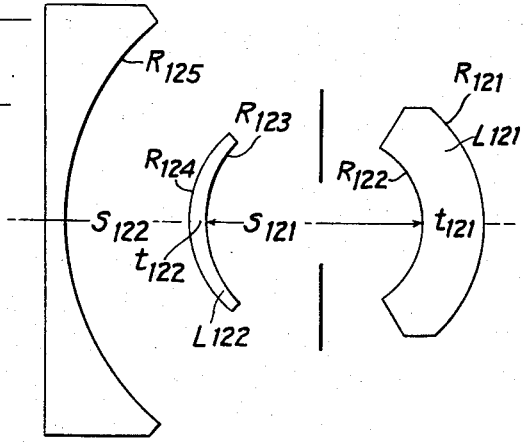
Fig. 12 shows a system which is corrected for chromatic aberration.

Figure 12 shows a modification of Figure 10 wherein the axial color is greatly reduced by these means. The quasi-symmetry of the two elements offers advantages in reducing the lateral aberrations in this arrangement.

In the present specification most of the examples are given in their strictly concentric form, the slight chromatic aberration being accepted, since the wide angular field of this type is often a great advantage, and since broad design problems are much easier to work out with concentric surfaces on account of the computing short-cuts already mentioned. Chromatic aberration is quite harmless when substantially monochromatic light is used and is small in any case.

Still another variation of the invention involves making the meniscus correcting element thicker at the edges. This makes the chromatic aberration slightly worse but makes the correcting element thinner and hence more convenient, particularly in systems of long focal length. Here again the shape of the correcting element can be chosen to correct first order coma, but there may be slight lateral color, astigmatism, angular distortion, and higher order coma. In such systems the center of curvature of the convex surface of the meniscus component should be no farther away from the lens than 1.12 times the radius of curvature of the concave surface. It will be noted that in the color corrected lenses the former is closer to the lens than is the latter. The limits of the most useful range in both directions may be summed up by saying that the radius of curvature of the convex surface should be greater than the thickness of the lens and less than the sum of the thickness plus 1.12 times the radius of curvature of the concave surface.

Likewise, the lens element can depart somewhat from concentricity with the spherical reflecting surface, and about the same limits are convenient to apply here. The center of curvature of at least one surface of the lens element should be separated from the center of curvature of the reflecting surface by less than 20% and preferably less than 12% of the radius of curvature of the concave surface of the lens component. In systems with more than one component, the bending of one can be balanced against that of the others. If the percentage just defined is given a negative sign when the center of curvature of the refracting surface is between the reflecting surface and its center of curvature, then the algebraic sum of such percentages for a selected surface of each lens component should amount to less than 20% in absolute value, and preferably the like sum for both surfaces of all meniscus correcting elements should be less than 20%.

The plane of the aperture stop should be within a distance of half the focal length of the objective from the center of curvature of the reflecting surface and preferably it passes through that point.

At about this point in the present development, there appeared a paper by D. D. Maksutov, Optical Soc. of Amer. Journal, vol. 34, pp. 270–284, showing for the most part systems with a single correcting element between the focal surface and the center of curvature of the mirror and adapted to astronomical telescopes of various types, and some other systems in which the meniscus is far from concentric with the mirror.

According to the present invention a much higher aperture and a much higher degree of correction of the zonal spherical aberration are gained by making the curvatures of the lens surfaces much weaker, the shortest radius of curvature shown being slightly over 0.66F in Example 11 (Fig. 12) described below. Figs. 7 and 12 are the only examples showing a correcting element between the focal surface and the center of curvature, as shown by Maksutov. Also in every example shown each surface of at least one meniscus correcting element has a radius of curvature greater than 0.79F.

A subsequent thorough study of the zonal spherical aberration showed that of all the strictly concentric systems shown and described herein, the type shown in Figs. 7 or 8 is the worst (neglecting the effect of the aspheric plate $L_{83}$) that shown in Fig. 5 is considerably better, while that shown in Fig. 1 has a very small zonal aberration of the opposite sign. This immediately pointed to intermediate forms in which the zonal aberration is exactly corrected, and computing was begun to determine the exact dimensions of a few such systems.

Figure 9:
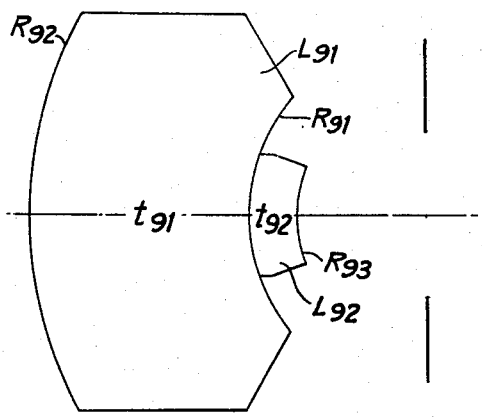
Fig. 9 shows a modified back-silvered mirror system.

Fig. 9 (Example 6) shows, as a first approximation to zonal correction, a back-silvered mirror $L_{91}$ with a meniscus lens $L_{92}$ of small diameter cemented onto its front surface $R_{91}$ so that the reflected pencils of rays traverse the small lens to reach the focal surface $R_{93}$ on the front face of the latter. This arrangement results in a still better zonal aberration than that for Fig. 1.

Attention was directed next to a broad consideration of the problem of zonal correction. It is evident that there are two elementary systems intermediate between those of Fig. 1 and Fig. 5, both capable of having the zonal spherical aberration corrected for at least one intermediate zone. The space between the reflecting surface and the focal surface is filled in the one case by a lens element between two airspaces and in the other case by an airspace between two lens elements. Either of these elementary forms (not shown) may be modified by shifting a lens element to the other side of the center, by placing an additional element on the other side of the center, or in other ways. Furthermore, the space between the reflecting sphere and the focal sphere may be divided into more than three parts, whereby a still greater refinement of correction of the zones could be gained.

Fig. 10 (Example 7) shows the first of these two forms modified by the addition of an identical lens element $L_{101}$ in front of the diaphragm. Thus the light goes through the front element $L_{101}$ once and through the rear element $L_{102}$ twice, being reflected at the mirror $L_{103}$ in the meantime. The spherical aberration is small at all zones and is zero at two: at one near the margin and at one intermediate zone about three-fourths as large in diameter. As previously mentioned, this system, because of its symmetry, is particularly suitable for a high degree of correction of the longitudinal (i. e. axial) color with the introduction of but a very small degree of lateral aberrations. A modification was computed afterward in which the axial color is substantially corrected and is shown in Fig. 12 with data given as Example 11, below.

Figure 11:
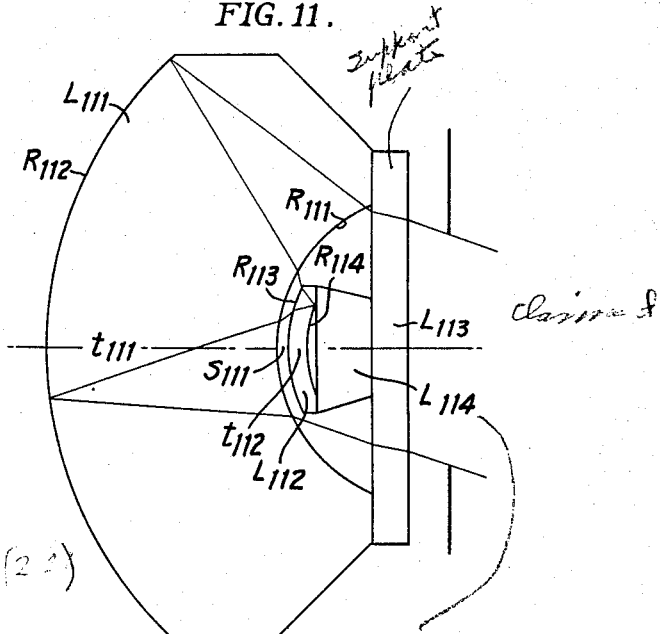
Figs. 10 and 11 show preferred forms of catadioptric systems with corrected zonal spherical aberration.

Fig. 11 (Example 8) shows the second of these two elementary forms modified so that the lens element next to the focal curve is traversed only once. This element is too thin for convenient use if traversed twice (and if the zonal aberration is corrected). As shown, the incident beam of light of annular cross section traverses the large lens element $L_{111}$, is reflected at its back surface $R_{112}$, then converges toward the front surface $R_{111}$ and the small lens element $L_{112}$. The latter should be of the minimum practical size to receive the image over the angular field desired. A glass plate $L_{113}$ and a post $L_{114}$ attached thereto is added to support the small lens element. The diaphragm is displaced so that it is not actually concentric with the surfaces but, on account of the action of the plane-parallel plate $L_{113}$ it is optically so. Alternatively the small lens may be supported by a ring-shaped spacer cemented to the front of the large lens.

The zonal correction of this optical system is truly amazing. The aberration at all zones up to f/0.54 is vanishingly small, and several values computed as for an immersion objective are given below. The useful aperture is somewhat reduced by the area of the small meniscus lens. Still, even with an angular field of ±20° the remaining aperture is about f/0.63. In monochromatic or nearly monochromatic light the performance of this system far surpasses anything hitherto known. Microscope objectives compounded of many elements have somewhat larger apertures, but this system of only two elements has an image that is uniformly sharp out to the edge of a large angular field.

Except for Fig. 2, all the examples thus far described were computed using a refractive index of 1.49775, which is that of a commercially available glass. I next observed that Figs. 1 and 2 have zonal aberration of opposite signs. The intermediate form with corrected zonal aberration was then determined and found to have a relative index of about 1.35. This system is shown below as Example 9. It has a very flat aberration curve, although not quite as good as that of Fig. 11 (Example 9).

As a final stage in this phase of the development, the index was varied in the type system shown in Fig. 9. A large increase in index was found to improve the zonal aberration slightly until with an index of about 2.00 a nearly perfect correction was obtained for apertures up to f/0.43. This system is shown below as Example 10. Aperture zones beyond f/0.5 are, of course, useless unless the objective is used as an immersion objective. Ordinary axial spherical aberration values are misleading when these very large apertures are involved. Accordingly the aberration has been computed as the deviation of the ray from the ideal image point measured perpendicularly to the ray and labeled "transverse aberration." It was computed within the lens medium as for an immersion objective. The aberration of Example 8, Fig. 11, has been recomputed for comparison and is given in a second column under that example. It is apparent that the correction of Example 10 is even superior to that of Example 8. Example 10 has serious practical drawbacks, however, particularly as regards the great thickness of both lenses. Glass with refractive index as high as this has been described in Reissue 21,175, Morey, August 15, 1939. This example points to future improvements to be gained by varying the indices of the two elements independently.

The data is given below for all the examples mentioned above. In most cases the refractive index is 1.49775. The dispersive index should be as high as possible. In one glass available commercially this is 67.0. In each example the equivalent focal length is 100 units.

*Example 1, Fig. 1—f/1.0*

$N_D = 1.49775$ $R_{11} = 112.0$  $t_{11} = 216.5$
$R_{12} = 328.5$  $BF = 12.0$

| $h_1$ | Spherical Aberration |
|---|---|
| 63.5 | −0.023 |
| 55.0 | +0.036 |
| 45.0 | +0.039 |
| 32.0 | +0.025 |

*Example 2, Fig. 2—f/1.2*

$N_D$ of ambient medium = 1.3330   $V = 55.6$
$N_D$ of lens $L_{21}$ = 1.6236   $V = 56.2$
$R_{21} = 100.00$   $t_{21} = 155.83$
$R_{22} = 255.83$   $BF = 0.00$

| $h_1$ | Spherical Aberration |
|---|---|
| 50.0 | 0.000 |
| 35.35 | −0.045 |

Example 3, Fig. 5—f/1.2

$N_D = 1.49775$ $R_{51} = 100.1$   $t_{51} = 31.$
$R_{52} = 131.8$   $S_{51} = 105.7$
$R_{53} = 237.5$   "BF" $= 0.1$

| $h_1$ | Spherical Aberration (from $R_{51}$) |
|---|---|
| 55.0 | +0.05 |
| 45.0 | −0.01 |
| 32.0 | +0.01 |
| Paraxial | +0.10 |

Example 4, Fig. 7

$N_D = 1.49775$ $R_{71} = +\ 79.23$   $t_{71} = 20.83$
$R_{27} = +100.06$   $S_{71} = 119.94$
$R_{73} = +220.0$

| $h_1$ | Spherical Aberration (from $R_{72}$) |
|---|---|
| 40.0 | +0.04 |
| 31.0 | −0.02 |
| 18.0 | +0.02 |
| Paraxial | +0.06 |

Example 5, Fig. 8

$N_D = 1.49775$ $R_{81} = -100.06$   $t_{81} = 20.83$
$R_{82} = -\ 79.23$   $S_{81} + t_{82} + S_{82} = 299.23$
$R_{83} = +220.0$   BF (from $R_{83}$) $= 120.0$
$R_{84} = \infty$

Example 6, Fig. 9

$N_D = 1.49775$ $R_{91} = +137.7$   $t_{91} = 175.5$
$R_{92} = +313.2$   $t_{92} = 37.7$
$R_{93} = +100.0$

| $h^1$ | Spherical Aberration |
|---|---|
| 71.0 | +0.024 |
| 63.5 | +0.003 |
| 55.0 | −0.010 |
| 45.0 | −0.015 |
| 32.0 | −0.012 |

Example 7, Fig. 10

$N_D = 1.49775$ $R_{101} = -155.5$   $t_{101} = 41.8$
$R_{102} = -113.7$   $S_{101} = 227.4$
$R_{103} = +113.7$   $t_{102} = 41.8$
$R_{104} = +155.5$   $S_{102} = 106.4$
$R_{105} = +261.9$

| $h_1$ | Spherical Aberration |
|---|---|
| 77.0 | −0.015 |
| 70.6 | +0.014 |
| 63.1 | +0.011 |
| 54.7 | −0.004 |
| 44.7 | −0.014 |
| 31.8 | −0.015 |

Example 8, Fig. 11

$N_D = 1.49775$ $R_{111} = 125.15$   $t_{111} = 191.40$
$R_{112} = 316.55$   $S_{111} = 8.65$
$R_{113} = 116.50$   $t_{112} = 16.50$
$R_{114} = 100.00$

| $h_1$ | Spherical Aberration (Immersion System) | |
|---|---|---|
|  | Axial | Transverse |
| 100.0 | −0.2109 mm. | −0.1405 mm. |
| 95.0 | −.0655 | −.0415 |
| 90.0 | −.0081 | −.0048 |
| 84.0 | +.0123 | +.0069 |
| 77.5 | +.0097 | +.0048 |
| 71.0 | .0000 | .0000 |
| 63.5 | −.0100 | −.0042 |
| 55.5 | −.0167 | −.0061 |
| 45.0 | −.0179 | −.0054 |
| 32.0 | −.0127 | −.0027 |

Example 9, Fig. 1

$N_D = 1.350$ $R_{11} = 107.72$   $t_{11} = 177.93$
$R_{12} = 285.65$   BF $= 7.72$

| $h_1$ | Spherical Aberration |
|---|---|
| 90.0 | −0.2547 |
| 84.0 | −0.0682 |
| 77.5 | −0.0075 |
| 71.0 | +0.0006 |
| 63.5 | −0.0087 |
| 55.0 | −0.0201 |
| 45.0 | −0.0250 |
| 32.0 | −0.0192 |

Example 10, Fig. 9

$N_D = 2.000$ $R_{91} = 194.4$   $t_{91} = 217.5$
$R_{92} = 411.9$   $t_{92} = 94.4$
$R_{93} = 100.00$

| $h_1$ | Transverse Spherical Aberration |
|---|---|
| 127.0 | −0.7361 |
| 118.5 | −0.0130 |
| 110.0 | +0.0109 |
| 100.0 | −0.0067 |
| 90.0 | −0.0081 |
| 77.5 | −0.0064 |
| 71.0 | −0.0029 |
| 63.5 | −0.0076 |
| 45.0 | −0.0012 |

Example 11, Fig. 12

Lens 121 ($N_D = 1.506$, V $= 71.5$)   Lens 122 ($N_D = 1.501$, V $= 56.5$)

$R_{121} = 95.0$   $t_{121} = 47.5$
$R_{122} = 66.5$   $S_{121} = 162.0$
$R_{123} = 86.0$   $t_{122} = 9.5$
$R_{124} = 88.4$   $S_{122} = 111.0$
$R_{125} = 216.2$

It will be noted that in the preferred examples the radius of curvature of the spherical reflecting surface is between 2 F and 3.5 F where F is the focal length of the objective.

Regarding the fields of application of these systems, there is an extensive literature on the different uses of the Schmidt type of system in astronomy, spectrography, photography, television, signalling, and microscopy, to mention only a few, and the details need not be repeated here except to say that the present invention is superior to the original Schmidt system in many of these fields.

A special word can be said regarding the long narrow strip type of image field already mentioned. Two special uses will be mentioned in this respect, photographic and signalling. The face of a long narrow strip of sensitive film may be pressed against the focal curve, for example in Fig. 5, and its back shielded from direct light. Light will then enter the system on both sides of the long narrow strip and come to a focus thereon. A panoramic picture would thus be taken, most probably of the horizon. The extent of the field in the long direction is limited only by the necessity of getting enough light into the image. At ±60° the apparent area of the diaphragm opening is about 50% of that at the axial object point. Some types of film have even more latitude than this, and a picture can be taken out to ±70° or ±80°. The same result can be accomplished with the forms shown in Figs. 9 and 11. In these cases the small meniscus lens in the front would have to be made up in a long narrow shape.

Regarding the applications to signalling, a similar long narrow strip could be silvered, and the lens system would then act as an autocollimating reflector visible at a great distance by reflected light. When the strip is oriented horizontally the reflector would be visible to anybody approximately in an horizontal plane and anywhere within a field of nearly 180°. On the other hand when the silvered strip is placed in a vertical plane it would be useful in guiding airplanes along a certain route or guiding them to a landing field. One edge of the silver strip could be tinted red and the other edge green to warn the pilot when he is going too far to the right or the left. The art of autocollimating reflectors is well developed, and many other applications will be evident to those skilled in the art.

These systems may be specially redesigned for use at finite conjugates. This is easy if the object and image are curved and concentric with the system. Otherwise, the fine correction of aberrations off the axis is lost. A development of the invention in which the long conjugate image surface is flat is described in my copending application Ser. No. 600,364, filed June 19, 1945, now Patent No. 2,409,971, October 22, 1946.

I claim:

A catadioptric objective for focusing an image on the convex side of a spherical focal surface comprising two air-spaced meniscus lenses with all four surfaces thereof substantially concentric with said focal surface and with each other, one of the lenses being thinner than the other, being substantially coextensive laterally with the focal surface and having its concave surface substantially coincident with the focal surface, the margins of the thicker lens extending beyond the periphery of the thinner lens, the convex surface of the thicker lens being silvered and the axial thickness of the thicker lens filling most of the distance between the silvered surface and the focal surface, and optical stop defining means optically aligned approximately at the center of curvature of the concentric surfaces for admitting light to the margins of the thicker lens for traversing this lens twice and then the thinner lens once to reach the focal surface.

HAROLD F. BENNETT.

REFERENCES CITED

The following references are of record in the file of this patent:

UNITED STATES PATENTS

| Number | Name | Date |
|---|---|---|
| 2,141,884 | Sonnefeld | Dec. 27, 1938 |
| 2,170,979 | Straubel | Aug. 29, 1939 |
| 2,295,802 | Nicoll | Sept. 15, 1942 |
| 2,336,379 | Warmisham | Dec. 7, 1943 |
| 2,350,112 | Houghton | May 30, 1944 |
| 2,378,301 | Kaprelian | June 12, 1945 |
| 2,458,132 | Baker | Jan. 4, 1949 |

FOREIGN PATENTS

| Number | Country | Date |
|---|---|---|
| 269,447 | Germany | Jan. 22, 1914 |
| 544,694 | Great Britain | Apr. 23, 1942 |
| 883,937 | France | Apr. 5, 1943 |
| 554,024 | Great Britain | June 16, 1943 |
| 557,771 | Great Britain | Dec. 3, 1943 |
| 68,442 | Norway | Oct. 16, 1944 |

OTHER REFERENCES

Scientific American, article by Ingalls, August 1939, pages 118 to 120 cited.

Muksutov, article in Journal of the Optical Society of America, volume 34, No. 5, May 1944, pages 270 to 284 inclusive, pages 280, 281 cited.